No. 891,012. PATENTED JUNE 16, 1908.
A. J. SHEPARD.
ANIMAL STOP FOR DRAINS.
APPLICATION FILED MAR. 21, 1908.

Witnesses:
Elmer R. Shipley.
M. S. Belden.

Andrew J. Shepard
Inventor
by James W. See
Attorney

UNITED STATES PATENT OFFICE.

ANDREW J. SHEPARD, OF COLLEGE CORNER, OHIO.

ANIMAL-STOP FOR DRAINS.

No. 891,012.             Specification of Letters Patent.      Patented June 16, 1908.

Application filed March 21, 1908. Serial No. 422,401.

*To all whom it may concern:*

Be it known that I, ANDREW J. SHEPARD, a citizen of the United States, residing in College Corner, Butler county, Ohio, (post-office address College Corner, Butler county, Ohio,) have invented certain new and useful Improvements in Animal-Stops for Drains, of which the following is a specification.

The present invention is designed to guard the outlet ends of drains against the entrance of animals and it will be readily understood from the following description taken in connection with the accompanying drawings in which:—

Figure 1:
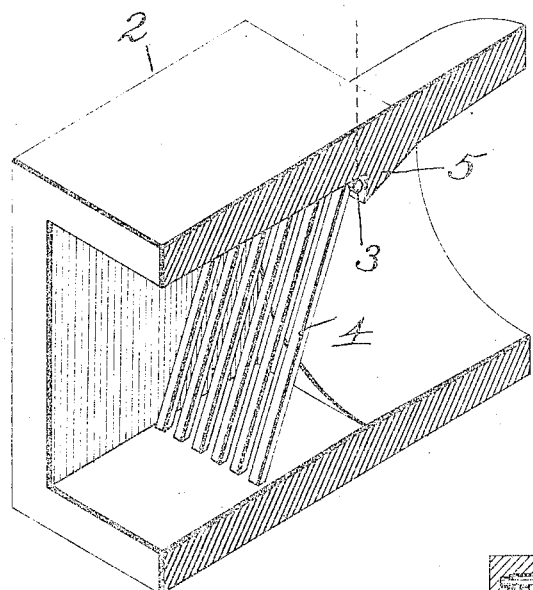
Figure 3:
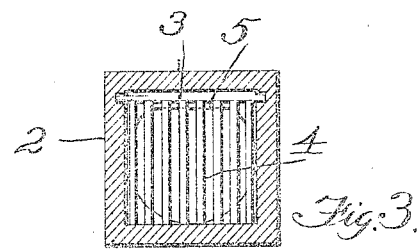
Figure 2:
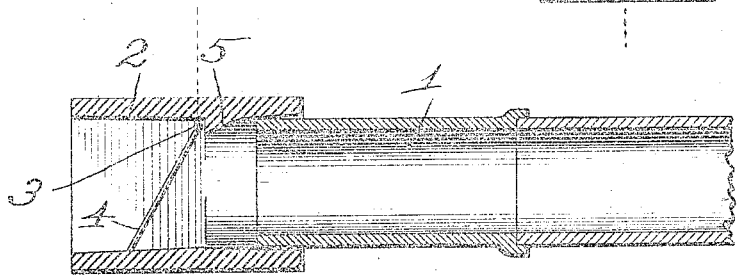

Figure 1 is a perspective view of my improved trap with portions of the walls cut away to expose the interior construction; Fig. 2 a vertical longitudinal section of the trap shown in conjunction with a portion of the drain of which the trap forms the terminal; and Fig. 3 a vertical transverse section.

In the drawing:—1, indicates a drain of usual character, illustrated as being formed of ordinary pipe which is to be assumed as covered up in the bottom of a ditch; 2, a short pipe section of rectangular cross-section having its inner end rounded and inclosing the outer end of the drain, this rectangular pipe section being molded of concrete; 3, a bar extending across the pipe section just below its top wall, the ends of this bar being rounded to form journals, which journals rest in molded recesses in the side walls of the pipe section; 4, a series of fingers having their upper ends fast with the bar 3, their lower ends resting on the floor of the rectangular pipe section at a point between the outer end of the pipe section and the vertical plane of the bar 3, the distance between these fingers being so small as to exclude such animals as rats, mice, rabbits etc.; and 5, a ledge extending across the top of the pipe section 2 to the rear of bar 3.

In molding the rectangular pipe section the fingered bar is set within the mold so that the completion of the molding completes the organization of the trap. Water flowing through the drain, as well as material carried by the water, may freely lift the gate formed by the fingers and pass out of the rectangular pipe section, the fingered gate closing by its own gravity when not being partially lifted by force acting upon its inner side. At the same time, and at all times, the fingered gate precludes the inward passage of animals. The ledge 5 protects the bar 3 and prevents trashy material from accumulating about the bar to clog the free swinging of the fingers.

I claim:—

1. An animal stop for drains, comprising a rectangular pipe section of molded material, a crossbar disposed across the pipe section below its roof and having its ends formed as journals molded into the side walls of the pipe section, and fingers having their upper ends permanently secured to the crossbar and their lower ends adapted to rest upon the floor of the pipe at a point forward of the vertical plane of the crossbar, combined substantially as set forth.

2. An animal stop for drains, comprising a rectangular pipe section of molded material, a crossbar disposed across the pipe section below its roof and having its ends formed as journals molded into the side walls of the pipe section, and fingers having their upper ends permanently secured to the crossbar and their lower ends adapted to rest upon the floor of the pipe section at a point forward of the vertical plane of the crossbar, and a protecting ledge extending across the pipe section to the rear of the crossbar, combined substantially as set forth.

ANDREW J. SHEPARD.

Witnesses:
 D. O. BLACK,
 PETER DRAKE.